United States Patent
Neuwirth

(10) Patent No.: US 8,428,912 B2
(45) Date of Patent: Apr. 23, 2013

(54) SENSOR DEVICE FOR A TEST STAND AND TEST STANDS, PREFEREABLY FOR ENGINES

(75) Inventor: Werner Neuwirth, Graz (AT)

(73) Assignee: AVL List GmbH, Graz (AU)

( * ) Notice: Subject to any disclaimer, the term of this patent is extended or adjusted under 35 U.S.C. 154(b) by 1132 days.

(21) Appl. No.: 12/224,610

(22) PCT Filed: Mar. 1, 2007

(86) PCT No.: PCT/AT2007/000103
§ 371 (c)(1),
(2), (4) Date: Oct. 16, 2008

(87) PCT Pub. No.: WO2007/098519
PCT Pub. Date: Sep. 7, 2007

(65) Prior Publication Data
US 2012/0065938 A1      Mar. 15, 2012

(30) Foreign Application Priority Data

Mar. 2, 2006   (AT) ................................ GM152/2006

(51) Int. Cl.
*G01M 15/02* (2006.01)
*G06F 17/40* (2006.01)
*G06F 11/30* (2006.01)
*G06F 19/00* (2011.01)

(52) U.S. Cl.
USPC ..................... 702/187; 73/114.01; 73/116.01; 73/865.8; 73/865.9; 340/679; 340/870.07; 702/1; 702/34; 702/127; 702/182

(58) Field of Classification Search ............... 73/114.01, 73/116.01, 116.02, 432.1, 865.8, 865.9; 340/500, 340/540, 679, 870.01, 870.07, 870.16, 870.28, 340/870.29, 870.3, 870.31, 870.37; 702/1, 702/33, 108, 113, 127, 182, 187, 188
See application file for complete search history.

(56) References Cited

U.S. PATENT DOCUMENTS

| | | | | |
|---|---|---|---|---|
| 2,883,255 A | * | 4/1959 | Anderson | 346/34 |
| 3,321,613 A | * | 5/1967 | Searle | 702/182 |
| 3,527,087 A | * | 9/1970 | Converse et al. | 73/116.02 |
| 3,648,819 A | * | 3/1972 | Converse et al. | 198/346.1 |
| 4,993,258 A | | 2/1991 | Pana et al. | |
| 5,073,781 A | * | 12/1991 | Stickelbrocks | 342/51 |
| 5,854,994 A | * | 12/1998 | Canada et al. | 700/108 |
| 5,907,491 A | * | 5/1999 | Canada et al. | 700/108 |

(Continued)

FOREIGN PATENT DOCUMENTS

| | | |
|---|---|---|
| EP | 0918212 | 5/1999 |
| EP | 1180674 | 7/2001 |
| WO | 2005005930 | 1/2005 |

OTHER PUBLICATIONS

English Abstract of EP0918212.

(Continued)

*Primary Examiner* — Edward Cosimano
(74) *Attorney, Agent, or Firm* — Dykema Gossett PLLC

(57) ABSTRACT

A test stand sensor apparatus includes a sensor for acquiring data from the item under test and/or the environment, a power supply unit for converting electromagnetic radiation into electrical energy, and a unit for the wire-free transmission of sensor data and of a code which is characteristic of the sensor.

7 Claims, 2 Drawing Sheets

U.S. PATENT DOCUMENTS

| | | | |
|---|---|---|---|
| 6,301,514 B1* | 10/2001 | Canada et al. | 700/108 |
| 7,021,127 B2* | 4/2006 | Schroeder et al. | 73/114.26 |
| 7,148,803 B2* | 12/2006 | Bandy et al. | 340/539.16 |
| 7,230,532 B2* | 6/2007 | Albsmeier et al. | 340/539.26 |
| 7,365,455 B2* | 4/2008 | Hamel et al. | 307/151 |
| 7,492,254 B2* | 2/2009 | Bandy et al. | 340/540 |
| 7,589,624 B2* | 9/2009 | Hatakeyama | 340/505 |
| 7,688,182 B2* | 3/2010 | Nagai | 340/10.41 |
| 7,726,184 B2* | 6/2010 | Cook et al. | 73/146.5 |
| 7,730,772 B2* | 6/2010 | Cook et al. | 73/146.5 |
| 7,777,623 B2* | 8/2010 | Albsmeier et al. | 340/539.26 |
| 7,860,680 B2* | 12/2010 | Arms et al. | 702/127 |
| 8,120,511 B2* | 2/2012 | Reichl et al. | 340/870.07 |
| 2003/0234730 A1* | 12/2003 | Arms et al. | 340/870.01 |
| 2004/0002835 A1* | 1/2004 | Nelson | 702/188 |
| 2005/0030177 A1* | 2/2005 | Albsmeier et al. | 340/539.26 |
| 2005/0088299 A1* | 4/2005 | Bandy et al. | 340/539.16 |
| 2005/0116544 A1* | 6/2005 | Hamel et al. | 307/46 |
| 2005/0150281 A1* | 7/2005 | Schroeder et al. | 73/116 |
| 2006/0106577 A1* | 5/2006 | Hatakeyama | 702/183 |
| 2006/0181414 A1* | 8/2006 | Bandy et al. | 340/539.22 |
| 2007/0096880 A1* | 5/2007 | Nagai | 340/10.41 |
| 2007/0222584 A1* | 9/2007 | Albsmeier et al. | 340/539.1 |
| 2009/0165546 A1* | 7/2009 | Cook et al. | 73/146.5 |
| 2009/0167503 A1* | 7/2009 | Cook et al. | 340/10.41 |
| 2009/0212918 A1* | 8/2009 | Bandy et al. | 340/10.1 |
| 2009/0315736 A1* | 12/2009 | Reichl et al. | 340/870.16 |
| 2011/0090888 A1* | 4/2011 | Arms et al. | 370/338 |

OTHER PUBLICATIONS

English Abstract of EP1180674.

* cited by examiner

SENSOR DEVICE FOR A TEST STAND AND TEST STANDS, PREFEREABLY FOR ENGINES

BACKGROUND OF THE INVENTION

1. Field of the Invention

The invention relates to a test stand sensor apparatus, including a sensor for acquiring data from the item under test and/or the environment, and a test stand, preferably for prime movers, including at least one test cell with at least one sensor for acquiring data from the item under test and/or the environment, and at least one evaluation and/or memory unit for the data, and, if needed, at least one preparation area for preparing the item under test and/or the at least one sensor.

2. The Prior Art

Test stand arrangements of the cited type are known and used in a very wide variety of construction stages for a very wide variety of measurement tasks in vehicles. Even in the simplest test stands, in which the drive wheels of the vehicle to be tested are placed on a single or double roller of a roller test stand and fixed relative to the roller test stand by means of a suitable fixing device, a complex arrangement of sensors and actuators is used. Therefore, it is necessary, for example, for data from the driven or braked test stand rollers—nowadays usually braked or driven in a controlled manner by means of electrical drive or load machines—to be transmitted from, but also for control signals to be transmitted to the drives of these rollers.

Particularly in the development sector, specifically in engine development, and partly also in the field of final inspection by the vehicle manufacturer, test stand arrangements are used in even further developed stages. In this case, a large number of measurement and supply assemblies are provided for the item under test, for example measurement devices for fuel consumption, exhaust-gas measuring devices, acoustic measuring devices, temperature-monitoring devices for coolants and lubricants and the like, and secondly additional arrangements for conditioning cooling air and cooling water, for separate cooling and treatment of lubricants, and various devices for central measurement data acquisition and evaluation and for controlling the test sequences and the like. All this makes modern test stand arrangements of the type mentioned in the introduction very complicated in terms of construction, and requires a high degree of outlay specifically for optimal laying of measurement and control cables, but also for supplying power to all the sensor and actuator arrangements.

The object of the present invention was therefore to provide a sensor apparatus for test stands of this kind which permits relatively simple and relatively uncomplicated construction of the test stand. However, operational reliability, failure reliability and functional reliability requirements must not be ignored in the process. Simple maintenance should also be ensured.

SUMMARY OF THE INVENTION

In order to achieve this object, the invention makes provision for the sensor apparatus to have a power supply unit for converting electromagnetic radiation into electrical energy, and a unit for the wire-free transmission of the sensor data and of a code which is characteristic of the sensor. Therefore, the physical cables for data and power supply can be dispensed with, this significantly simplifying construction of the test stand, with the individual components being more easily accessible. This also largely reduces faults in connection of the data connections. This technique permits virtually ideal DC isolation.

In order to be able to operate the sensor apparatus autonomously and without a great deal of outlay on servicing for as long as possible, it is characterized, according to one advantageous embodiment, in that the power supply unit has photovoltaic cells. Since a large number of light sources are present in most test stand arrangements in any case, construction of the test stand can therefore be simplified without substantial additional outlay.

Secondly, again avoiding the use of physical cables for supplying power to the sensor apparatus, provision can also alternatively be made for the power supply unit to have at least one coil for converting electromagnetic fields into electricity. Therefore, wire-free supply of power to the sensor apparatus can be ensured even when light sources are missing or intentionally avoided.

In all cases where sensor apparatuses are supplied with power in a wire-free fashion, provision is advantageously made for the power supply unit to have a buffer device.

According to a first embodiment of the invention, the buffer device includes a capacitor.

In contrast, another embodiment makes provision for the buffer device to include a storage battery.

In order to avoid functional faults or total failures to the extent possible, one advantageous embodiment of the invention makes provision for a transmission device to be provided for the charge state messages of the buffer device. Therefore, better illumination of the sensor, exchange of the power source or else replacement of the sensor apparatus itself can be provided for, before the test run becomes unserviceable or has to be interrupted due to failure of the sensor apparatus.

The sensor apparatus can advantageously also additionally be further characterized in that a reception unit is provided for receiving control signals which are transmitted in a wire-free fashion.

The object of the present invention is also achieved by a test stand as described in the introduction which is characterized in that at least one sensor is configured according to one of the preceding paragraphs.

According to one advantageous embodiment of the invention, devices for substantially continuously generating electromagnetic radiation for the sensor apparatuses are provided in at least one of the test cells. Therefore, simple and uncomplicated construction is ensured in the test cell. By avoiding physical cables, the operational reliability, failure reliability and functional reliability are also provided since faults in connection, for example of data connections, are largely reduced. The risk of injuries or damage to sensors, cables etc. is also minimized by the clear design.

The devices are advantageously provided for substantially continuously generating electromagnetic radiation for the sensor apparatuses in at least one preparation area by extension of these said advantages for preparation of the test run and checking for correct design.

If devices which are present in any case for illuminating the test stand or preparation area cannot be used, one advantageous embodiment of the invention makes provision for lighting devices to be provided for the photovoltaic cells of the power supply units of the sensor apparatuses.

In order to be able to manage without lighting devices and nevertheless permit power to be supplied to corresponding sensor apparatuses, an alternative embodiment of the invention makes provision for devices to be provided for generating electromagnetic fields.

Provision can advantageously be made for the field strength or light intensity of the lighting devices or devices for generating electromagnetic fields to be adjusted, preferably by means of a control circuit which operates in dependence on the charge state messages of the sensor apparatuses. Therefore, permanent illumination or radiation can be avoided and energy can be saved. The light intensity or the field strength of the electromagnetic fields is preferably controlled in accordance with the power requirements of the sensor apparatus which is illuminated or supplied most weakly.

According to a further embodiment of the invention, the test stand is characterized in that a transmission unit is provided for control signals for the sensor devices, preferably integrated in the evaluation and/or memory unit or connected to it. The sensor apparatuses can also be synchronized on account of this type of bidirectional data transfer.

If an interrogation routine which monitors the sensor apparatuses and registers or signals an inadequate charge state and/or failure is further implemented in the evaluation and memory unit, faulty test runs can be interrupted at an early stage or corresponding measures can be taken or fault identification can be performed or facilitated at least afterward.

In order to make the construction of the test stand simpler and to avoid faults in the data connections, one advantageous embodiment of the invention is characterized in that a routine which identifies the sensor apparatuses and assigns them to specific measurement channels is implemented in the evaluation and memory unit.

If a transmission unit for control signals for the sensor devices and an evaluation unit are already provided in the preparation area, with an interrogation routine which monitors the sensor apparatuses and registers or signals an inadequate charge state and/or failure being implemented, the sensor system can be functionally checked as early as before the actual test run.

For complete preparation of the actual test run, provision is advantageously made for a routine which identifies the sensor apparatuses and assigns them to specific measurement channels of the evaluation and memory unit of the test stand to be implemented in the transmission unit or the evaluation unit in the preparation area. Therefore, the construction of the item under test and the sensor system can be fully prepared prior to the test run, so that the actual test cell can be utilized in an optimum manner.

BRIEF DESCRIPTION OF THE FIGURES

The invention will be described in greater detail in the following description with reference to a preferred exemplary embodiment which is also illustrated in the appended figures wherein.

DETAILED DESCRIPTION OF THE PREFERRED EMBODIMENT

Figure 1:
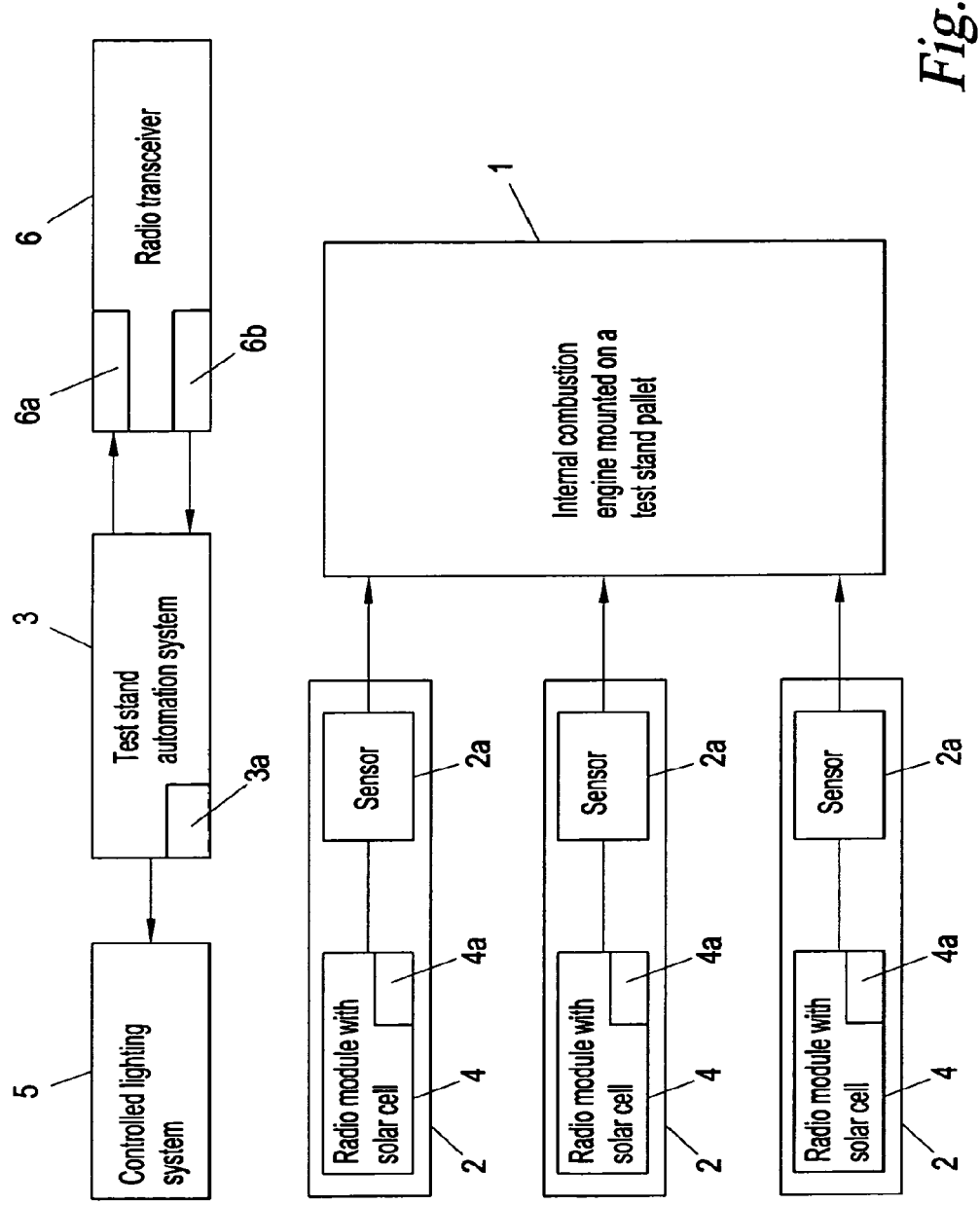
FIG. 1 shows a schematic block diagram of a test stand which is fitted out in accordance with the invention.

As can be seen from FIG. 1, a test stand which is configured in accordance with the invention may be present, for example, in the form of a test stand pallet 1 on which an internal combustion engine is mounted, preferably in a preparation area, as an item under test. In order to acquire data from this engine, but also its operating means and/or the environment, a plurality of, here for example 3, sensor apparatuses 2 are then provided in the actual test cell. The sensor apparatuses 2 may also be already constructed in the preparation area and be connected to the item under test. An evaluation and/or memory unit for the data from the sensor apparatuses, which evaluation and/or memory unit may be part of a test stand automation and control system 3, is provided as a part of the test stand pallet 1, if need be also separated therefrom and coupled by means of suitable data transmission devices.

According to the invention, the test stand sensor apparatus 2 additionally comprises, in addition to the actual sensor system 2a, a unit 4 for the wire-free transmission both of an identification code for the respective sensor and of the sensor data. If need be, this sensor identification could also be determined or defined from the frequency or other properties of the data or data packets themselves. Therefore, the sensor apparatuses 2 can be connected to an evaluation and/or memory unit 3a of the test stand automation and control system 3 (FIG. 1) without physical cabling, with the association between sensors 2 and measurement channels in the evaluation and/or memory unit 3a of the test stand automation and control system 3 being defined at the beginning. This preparation can be performed as early as in the preparation area, before the test stand pallet 1 is moved into the actual test cell. In order to not overload the evaluation and/or memory unit 3a of the test stand automation and control system 3, a separate evaluation and/or memory unit 3a may also be provided in the preparation area in this case, with the aid of which separate evaluation and/or memory unit 3a the commissioning and described pre-programming can be carried out and then transmitted to the unit of the test cell.

For a simpler and clearer construction on the test stand, the sensor apparatuses 2 are provided not only with cable-free data transmission but also with wire-free power supply via artificial electromagnetic radiation with which the sensor apparatuses 2 can be substantially continuously supplied and which is converted into electrical energy there. In this case, energy can advantageously be supplied via solar cells of the sensor apparatuses 2, but could also be supplied via at least one coil L1 (FIG. 2) for converting electromagnetic fields, preferably in the kHz range. The devices 5 for substantially continuously generating the electro-magnetic radiation required by the sensor apparatuses 2 have to be provided in at least one of the test cells of the test stand, but are advantageously already provided in at least one preparation area, so that preparation, construction and functional checking of the sensor system can be completely carried out there and not unnecessarily block the actual test cell.

Figure 2:
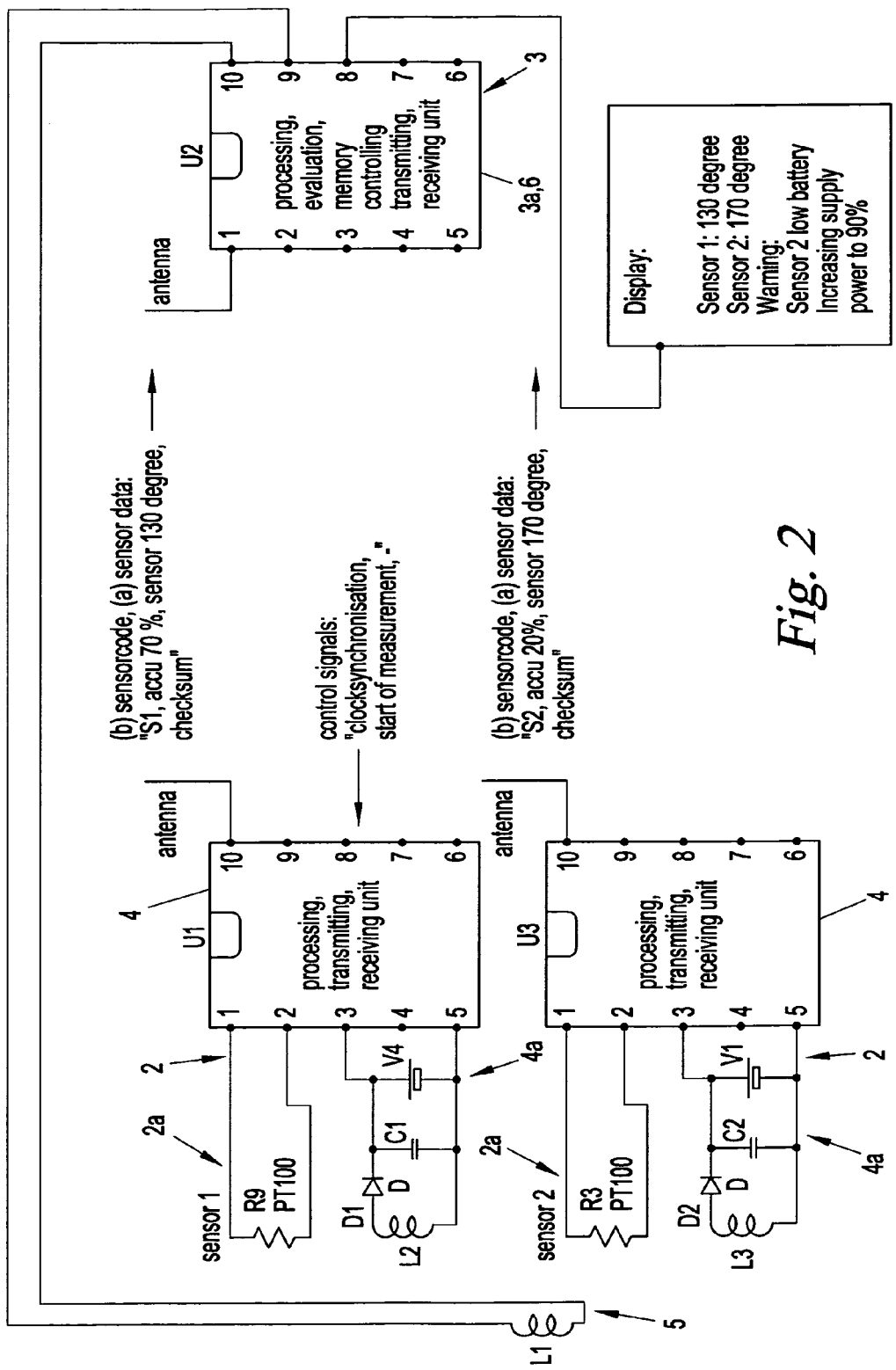
FIG. 2 shows a schematic block diagram of a circuit for exchanging data and power in accordance with the invention.

In order to be able to prevent brief interruptions in the illumination or power supply by means of electromagnetic fields, the power supply unit 4a has a buffer device, for example a capacitor C1, C2 and/or a storage battery V1, V4 (FIG. 2).

Given substantially simplified cabling on the test stand 1, the sensor signals of the sensor system 2a are already decentrally digitized during the actual test run in the vicinity of the sensors and transmitted to a receiver 6a, which is connected to the evaluation and/or memory unit 3a of the test stand automation and control system 3, via the unit 4 by means of radio transmission. The transmission frequency is preferably in the GHz range and therefore requires only short antennas. The required transmission energy is 100 µWs per transmission process and the detection rate is 10 Hz per sensor.

It is not only possible for a receiver 6 to be provided for the data signals of the sensors 2 in the test stand automation and control system 3, but a transmission unit 6b for control signals for the sensor apparatuses 2 can advantageously also be present, for example in the form of a combined transceiver unit 6. The radio transceiver 6 transmits synchronizing telegrams and parameters to the radio modules of the sensor apparatuses 2 and receives from them the measurement data and information about the power requirement. The test stand automation system 3 provides the parameters and the synchronization.

An interrogation routine which monitors the sensor apparatuses 2 and registers or signals an inadequate charge state and/or failure is now implemented in this transceiver unit 6 and/or in the evaluation and memory unit 3*a*. This monitoring evaluates additional signals which are transmitted via the transmission devices 4, and signals the illumination situation and/or charge state messages of the capacitor or storage battery. To this end, the test stand automation system 3 cyclically checks whether all the parameterized sensor apparatuses 2 transmit data. If this is not the case, or a radio module reports a negative power balance over several minutes, a message is output to the test stand operator for example. Parts of this functionality, which are required for commissioning and functional checking, can also be realized in a separate unit in the preparation area.

In order to illuminate the solar cells of the sensor apparatuses 2, lighting devices 5 or else devices for generating electromagnetic fields are provided on the test stand 1. In this case, the light intensity of the lighting devices 5, or the field strength of electromagnetic fields, can be adjusted, preferably by means of a control circuit, which operates in dependence on the charge state messages of the sensor apparatuses 2, in the test stand automation and control system 3.

I claim:

1. A test stand, comprising
at least one test cell with at least one sensor apparatus for acquiring data from an item under test and/or the environment, a sensor apparatus comprising a sensor system, a power supply unit for converting electromagnetic radiation into electrical energy, and a unit for wire-free transmission of charge state messages, sensor data and code which is characteristic of the sensor apparatus,
at least one evaluation and/or memory unit for the data, and
devices for substantially continuously generating electromagnetic fields for supplying the at least one sensor apparatus, said devices including control circuits operating in dependence on the charge state messages of the at least one sensor apparatus for adjusting the electromagnetic fields.

2. The test stand as claimed in claim 1, wherein the devices for substantially continuously generating electromagnetic fields comprise lighting devices and the power supply unit of the sensor apparatus comprises photovoltaic cells.

3. The test stand as claimed in claim 1, including a transmission unit for control signals for the sensor apparatus, integrated in the evaluation and/or memory unit or connected to it.

4. The test stand as claimed in claim 1, wherein an interrogation routine which monitors the sensor apparatus and registers or signals an inadequate charge state and/or failure is implemented in the evaluation and memory unit.

5. The test stand as claimed in claim 1, including a plurality of sensor apparatuses, and wherein a routine which identifies and assigns the sensor apparatuses to specific measurement channels is implemented in the evaluation and memory unit.

6. The test stand as claimed in claim 1, including a transmission unit for control signals for the sensor apparatus and an evaluation unit in a preparation area, with an interrogation routine which monitors the sensor apparatus and registers or signals an inadequate charge state and/or failure being implemented.

7. The test stand as claimed in claim 6, including a plurality of sensor apparatuses, and wherein a routine which identifies and assigns the sensor apparatuses to specific measurement channels of the evaluation and memory unit of the test stand is implemented in the transmission unit or the evaluation unit in the preparation area.

\* \* \* \* \*

UNITED STATES PATENT AND TRADEMARK OFFICE
CERTIFICATE OF CORRECTION

PATENT NO. : 8,428,912 B2
APPLICATION NO. : 12/224610
DATED : April 23, 2013
INVENTOR(S) : Werner Neuwirth It is certified that error appears in the above-identified patent and that said Letters Patent is hereby corrected as shown below:

On the Title page

Item (73) Assignee: should read: AVL List GmbH, Graz (AT)

Signed and Sealed this
Tenth Day of September, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,428,912 B2  Page 1 of 1
APPLICATION NO. : 12/224610
DATED : April 23, 2013
INVENTOR(S) : Werner Neuwirth It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1177 days.

Signed and Sealed this
Eighth Day of September, 2015

Michelle K. Lee
*Director of the United States Patent and Trademark Office*